United States Patent
Okazaki et al.

(10) Patent No.: US 9,316,163 B2
(45) Date of Patent: Apr. 19, 2016

(54) CONTROL DEVICE FOR INTERNAL COMBUSTION ENGINE

(75) Inventors: Shuntaro Okazaki, Sunto-gun (JP); Satoshi Yoshizaki, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 246 days.

(21) Appl. No.: 14/232,772

(22) PCT Filed: Aug. 31, 2011

(86) PCT No.: PCT/JP2011/069800
§ 371 (c)(1),
(2), (4) Date: Jan. 14, 2014

(87) PCT Pub. No.: WO2013/030990
PCT Pub. Date: Mar. 7, 2013

(65) Prior Publication Data
US 2014/0209062 A1  Jul. 31, 2014

(51) Int. Cl.
*B60T 7/12* (2006.01)
*F02D 37/02* (2006.01)
*F02D 41/00* (2006.01)
*F02D 41/02* (2006.01)
*F02D 11/10* (2006.01)

(52) U.S. Cl.
CPC ............... *F02D 37/02* (2013.01); *F02D 11/105* (2013.01); *F02D 41/0002* (2013.01); *F02D 41/0082* (2013.01); *F02D 41/024* (2013.01); *F02D 41/0235* (2013.01); *F02D 2200/0804* (2013.01); *F02D 2250/18* (2013.01); *Y02T 10/26* (2013.01); *Y02T 10/42* (2013.01)

(58) Field of Classification Search
CPC ..................... F02D 2200/10; F02D 2200/1002
USPC .................. 701/103–106, 114, 115
See application file for complete search history.

(56) References Cited

U.S. PATENT DOCUMENTS

| | | | |
|---|---|---|---|
| 2010/0198485 A1 | 8/2010 | Ohtsuka et al. | |
| 2010/0268436 A1* | 10/2010 | Soejima | F02D 37/02 701/102 |

(Continued)

FOREIGN PATENT DOCUMENTS

| JP | 2009-047101 A | 3/2009 |
|---|---|---|
| JP | 2010-019227 A | 1/2010 |
| JP | 2010-053705 A | 3/2010 |

OTHER PUBLICATIONS

International Search Report of PCT/JP2011/069800 dated Sep. 27, 2011.

*Primary Examiner* — John Kwon
(74) *Attorney, Agent, or Firm* — Sughrue Mion, PLLC (57) ABSTRACT

An object of the present invention is to enable a requested efficiency by cylinder group that is requested from a viewpoint of exhaust gas performance to be realized precisely when an internal combustion engine having a single throttle shared by a plurality of cylinder groups, and having an exhaust gas purifying catalyst for each of the cylinder groups is operated at a different air-fuel ratio at each of the cylinder groups. To this end, a control device for the internal combustion engine provided by the present invention calculates an efficiency ratio of a representative efficiency determined based on the requested efficiency by cylinder group and a requested efficiency by cylinder group, and calculates a requested torque by cylinder group by dividing a requested torque by the efficiency ratio for each of the cylinder groups. The control device controls an opening of the throttle in accordance with the requested torque, the representative efficiency based on the requested efficiency by cylinder group, and a target air amount calculated from a representative air-fuel ratio based on a target air-fuel ratio by cylinder group, and controls ignition timing for each of the cylinder groups, in accordance with a target efficiency by cylinder group that is calculated as a ratio of the requested torque by cylinder group and an estimated potential torque.

6 Claims, 4 Drawing Sheets

(56) References Cited

U.S. PATENT DOCUMENTS

| | | | | |
|---|---|---|---|---|
| 2010/0269785 A1* | 10/2010 | Tanaka | ................... | F02D 37/02 123/348 |
| 2011/0071747 A1* | 3/2011 | Kato | ..................... | F02D 35/023 701/102 |
| 2011/0126803 A1* | 6/2011 | Soejima | ................ | F02D 35/023 123/406.26 |
| 2011/0144885 A1* | 6/2011 | Ohtsuka | ................ | F02D 11/105 701/102 |
| 2014/0041628 A1* | 2/2014 | Yoshizaki | ............ | F02D 11/105 123/402 |

* cited by examiner

CONTROL DEVICE FOR INTERNAL COMBUSTION ENGINE

CROSS REFERENCE TO RELATED APPLICATIONS

This is a National Stage of International Application No. PCT/JP2011/069800 filed Aug. 31, 2011, the content of all of which is incorporated herein by reference in its entirety.

TECHNICAL FIELD

The present invention relates to a control device preferable for use in an internal combustion engine that has a single throttle shared by a plurality of cylinder groups, and has an exhaust gas purifying catalyst for each of the cylinder groups.

BACKGROUND ART

As one of the control methods of internal combustion engines, a method that determines a manipulated variable of each actuator with an efficiency and an air-fuel ratio as well as a torque as controlled variables is known, as disclosed in, for example, Japanese Patent Laid-Open No. 2010-53705 and Japanese Patent Laid-Open No. 2009-047101. The efficiency mentioned here means a ratio of a torque that is actually outputted to a torque that an internal combustion engine can potentially output. Since an amount of heat that is supplied to an exhaust gas purifying catalyst via exhaust gas changes in accordance with an efficiency, the temperature of the exhaust gas purifying catalyst can be controlled by controlling the efficiency. In the arts disclosed in the above Patent Literatures, the requested efficiencies are directly used to calculate throttle openings. More specifically, a target air amount is calculated based on a value obtained by dividing a requested torque by a requested efficiency, and a throttle opening is determined based on the target air amount. Subsequently, an estimated value of the torque that is realized in the throttle opening is calculated with optimum ignition timing as a prerequisite, and with the ratio of the requested torque to the estimated value set as a target efficiency, ignition timing is determined. The respective actuators are operated in accordance with the throttle opening and the ignition timing determined in this manner, whereby the efficiency as is requested is realized as a result.

Incidentally, ordinary internal combustion engines for vehicles include multi-cylinder internal combustion engines each having a number of cylinders. In some of multi-cylinder internal combustion engines, cylinders are divided into a plurality of groups, and an exhaust gas purifying catalyst is installed for each of the plurality of cylinder groups. For example, in the V-internal combustion engine described in Japanese Patent Laid-Open No. 2010-019227, an exhaust gas purifying catalyst is installed in each of a left and right bank. In such an internal combustion engine, the efficiency is desirably controlled on a cylinder group-by-cylinder group basis from the viewpoint of exhaust gas performance. This is because the shapes of exhaust pipes differ by cylinder group, and there is a difference in warming-up performance of the exhaust gas purifying catalyst between the cylinder groups.

However, the requested efficiency that can be realized by the aforementioned control method is only one value, that is, the requested efficiency as an entire internal combustion engine. This is because, in the aforementioned control method, control of the efficiency by ignition timing is performed as part of a set with control of the air amount by the throttle opening. In the case of an internal combustion engine including a single throttle, the number of values of the throttle opening that is determined is one, and therefore, the number of values of the efficiency that can be realized in correspondence with this is also one. Accordingly, in the internal combustion engine in which a throttle is provided for each cylinder group, the throttle opening can be controlled on a cylinder group-by-cylinder group basis, and therefore, a different efficiency can be realized for each cylinder group. However, in many ordinary multi-cylinder internal combustion engines, a single throttle is shared by a plurality of cylinder groups. Even if the aforementioned control method is applied to the internal combustion engines like this, it is not easy to realize a different efficiency at each cylinder group.

Furthermore, in the case of a multi-cylinder internal combustion engine having an exhaust gas purifying catalyst for each cylinder group, air-fuel ratio feedback control is performed for each cylinder group. Therefore, in such an internal combustion engine, a different value is requested at each cylinder group with respect to not only the efficiency but also the air-fuel ratio. However, Japanese Patent Laid-Open No. 2010-53705 and Japanese Patent Laid-Open No. 2009-047101 mentioned above do not describe the control method in the case of performing operation with a different air-fuel ratio at each cylinder group.

CITATION LIST

Patent Literature

Patent Literature 1: Japanese Patent Laid-Open No. 2010-053705
Patent Literature 2: Japanese Patent Laid-Open No. 2010-019227
Patent Literature 3: Japanese Patent Laid-Open No. 2009-047101

SUMMARY OF INVENTION

The present invention is made in the light of the aforementioned problem, and has an object to provide a control device that can precisely realize a requested efficiency by cylinder group that is requested from a viewpoint of exhaust gas performance when an internal combustion engine is operated at a different air-fuel ratio for each cylinder group, in the internal combustion engine that has a single throttle shared by a plurality of cylinder groups, and has an exhaust gas purifying catalyst for each cylinder group.

According to one mode of the present invention, the present control device acquires respective requested values of a torque and an efficiency that are controlled variables of an internal combustion engine, and determines a target value of an air-fuel ratio that is also a controlled variable of the internal combustion engine. However, with respect to the torque, the present control device acquires one requested value (hereinafter, a requested torque) for the entire internal combustion engine, whereas with respect to the efficiency, the present control device acquires a requested value thereof on a cylinder group-by-cylinder group basis (hereinafter, a requested efficiency by cylinder group). Note that the "efficiency" in the present invention is defined as a ratio of a torque that is actually outputted to a potential torque that the internal combustion engine can potentially output. Further, with respect to the air-fuel ratio, the present control device acquires a target value thereof on a cylinder group-by-cylinder group basis (hereinafter, a target air-fuel ratio by cylinder group). The present control device determines a representative efficiency based on the acquired requested efficiencies by cylinder group, and determines a representative air-fuel ratio based on the determined target air-fuel ratios by cylinder group. As the representative efficiency, an average value or a median value of the requested efficiencies by cylinder group may be adopted, and a minimum value of the requested efficiencies by cylinder group is more preferably adopted. As the representative air-fuel ratio, an average value or a median value of the target air-fuel ratios by cylinder group may be adopted, and a maximum value of the target air-fuel ratios by cylinder group, namely, a leanest value is more preferably adopted.

The present control device carries out air amount control, ignition timing control and fuel injection amount control based on the requested torque, the requested efficiencies by cylinder group, target air-fuel ratios by cylinder group, the representative efficiency and the representative air-fuel ratio. In the air amount control, a requested potential torque is calculated first by dividing the requested torque by the representative efficiency. Subsequently, based on data in which a relation of an air amount and a torque in optimum ignition timing is set in association with the air-fuel ratio, a target value of the air amount for realizing the requested potential torque under the representative air-fuel ratio, that is, a target air amount is calculated. Subsequently, in accordance with the target air amount, an opening of the throttle is controlled. In the ignition timing control, an efficiency ratio of the representative efficiency and the requested efficiency by cylinder group is calculated first, and by dividing the requested torque by the efficiency ratio for each cylinder group, a requested torque by cylinder group is calculated. Further, apart from this, an estimated value of a potential torque that is realized under the optimum ignition timing, the representative air-fuel ratio and an actual throttle opening, that is, an estimated potential torque is also calculated. Subsequently, a target efficiency by cylinder group that is a ratio of the requested torque by cylinder group and the estimated potential torque is calculated, and ignition timing is controlled for each cylinder group in accordance with the target efficiency by cylinder group. In the fuel injection amount control, control of a fuel injection amount of each cylinder is performed in accordance with the target air-fuel ratio by cylinder group.

Control of each of the air amount, the ignition timing and the fuel injection amount is performed in this manner, whereby according to the present control device, the requested efficiency by cylinder group, which is requested from the viewpoint of exhaust gas performance can be precisely realized, while the internal combustion engine is operated at a different air-fuel ratio at each of the cylinder groups.

Note that concerning a method for determining the target air-fuel ratio by cylinder group, there are two preferable methods described as follows. According to a first preferable method, a requested value of the air-fuel ratio for each of the cylinder groups, that is, the requested air-fuel ratio by cylinder group is acquired. Subsequently, the requested air-fuel ratios by cylinder group are determined as target air-fuel ratios by cylinder group in the current time step, and the representative air-fuel ratio is determined based on the determined target air-fuel ratios by cylinder group in the current time step. According to the method, the requested value also can be realized precisely for each of the cylinder groups with respect to the air-fuel ratio, in addition to the requested efficiency by cylinder group.

According to a second preferable method concerning determination of the target air-fuel ratio by cylinder group, the target air-fuel ratio by cylinder group in the current time step is determined based on the requested torque by cylinder group and the operation state of the internal combustion engine, and the representative air-fuel ratio is determined based on the target air-fuel ratio by cylinder group in the previous time step. According to the method, the requested torque and the requested efficiency by cylinder group can be realized precisely. Note that when the method is selected, the target air-fuel ratio by cylinder group corresponding to the cylinder group in which the estimated temperature of the exhaust gas purifying catalyst is the lowest, that is, the cylinder group in which activity of the exhaust gas purifying catalyst is the most retarded may be determined as the representative air-fuel ratio.

DESCRIPTION OF EMBODIMENTS

Hereinafter, an embodiment of the present invention will be described with reference to the drawings.

Figure 1:
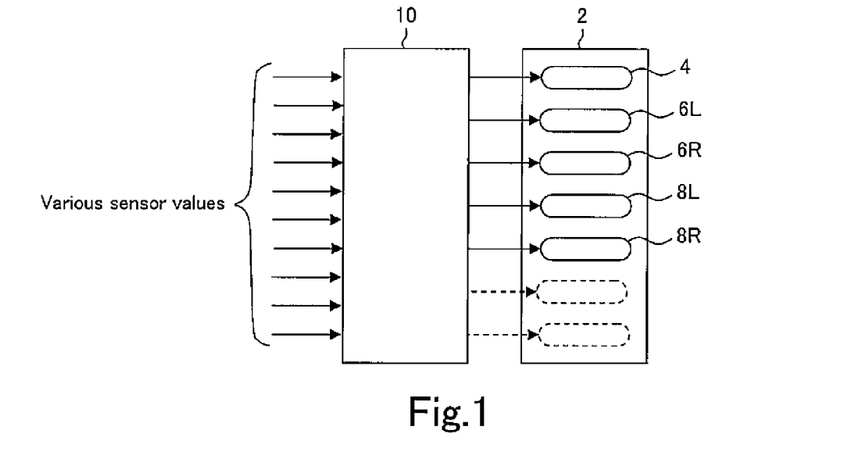
FIG. 1 is a block diagram showing a control system of an internal combustion engine according to an embodiment of the present invention.

FIG. 1 is a block diagram showing a control system of an internal combustion engine (hereinafter, an engine) of the present embodiment. The system includes an engine 2, an ECU (Electronic Control Unit) 10 that controls the engine 2, and various sensors for acquiring information concerning an operation state and operation conditions of the engine 2. The engine 2 that is an object to be controlled in the present embodiment is a spark ignition type four-cycle reciprocating engine, and is a V-engine having a left and a right bank. In the engine 2, an exhaust manifold is mounted on each of the banks, and an exhaust gas purifying catalyst for purifying exhaust gas is installed at each of the exhaust manifolds. Meanwhile, intake manifolds at the left and right banks are integrated, and a throttle 4 shared by the left and right banks is installed upstream thereof.

A control device of the present embodiment is realized as a part of a function of the ECU 10. The ECU 10 takes in various sensor values, operates actuators included in the engine 2 based on the sensor values, and thereby controls an operation of the engine 2. The actuators that the ECU 10 can operate include an ignition device, a fuel injection device, a variable valve timing mechanism, an EGR device and the like besides the throttle 4. However, it is the throttle 4, ignition devices 6L and 6R and fuel injection devices 8L and 8R at the left and right banks that the ECU 10 as the control device operates in the present embodiment. The ECU 10 controls the operation of the engine 2 by operating these actuators.

The ECU 10 uses a torque, an efficiency and an air-fuel ratio as controlled variables of the engine 2. The torque mentioned here more strictly means an indicated torque that the engine produces. The air-fuel ratio means an air-fuel ratio of an air-fuel mixture provided for combustion. The efficiency in the present description means a ratio of a torque that is actually outputted, to a torque (a potential torque) that the engine can potentially output. The ECU 10 determines requested values thereof based on various sensor values that the ECU 10 takes in. However, since the engine 2 includes the exhaust gas purifying catalyst at each of the left and right banks, different values are requested for each of the banks, with respect to the efficiency and the air-fuel ratio. This is because the efficiency and the air-fuel ratio both influence purifying performance of the exhaust gas purifying catalyst. Accordingly, the ECU 10 determines respective requested values with respect to the torque, a left bank efficiency, a right bank efficiency, a left bank air-fuel ratio and a right bank air-fuel ratio, and carries out air amount control, ignition timing control, and fuel injection amount control of the engine 2 to realize the requested values.

However, in the case of the engine 2 of the present embodiment, the requested values of all the above described controlled variables cannot be realized at the same time. The ignition timing and the fuel injection amount are controllable for each of the banks, but since the left and right banks share the single throttle 4 in the engine 2, control for each of the banks is impossible with respect to the air amount. In order to realize the requested values of all the above described controlled variables at the same time, air amount control, ignition timing control and fuel injection amount control have to be carried out independently for each of the banks.

Therefore, the ECU 10 is designed not to realize the requested values for all the above described controlled variables, but to realize the requested values for only the controlled variables of higher priority. More specifically, the ECU 10 has three realization modes which are different in controlled variable to which priority is given. Among them, a realization mode 1 is a mode that gives priority to realization of the efficiency and the air-fuel ratios of the left and right banks. A realization mode 2 is a mode that gives priority to realization of the torque and the air-fuel ratios of the left and right banks. A realization mode 3 is a mode that gives priority to realization of the torque and the efficiencies of the left and right banks. It is determined depending on the operation state and the operation conditions of the engine 2 which realization mode is to be selected, namely, to realization of which controlled variable priority is given. In the case of the present embodiment, the ECU 10 determines the realization mode to be carried out mainly based on a degradation degree of the exhaust gas purifying catalyst and an estimated temperature thereof.

Figure 2:
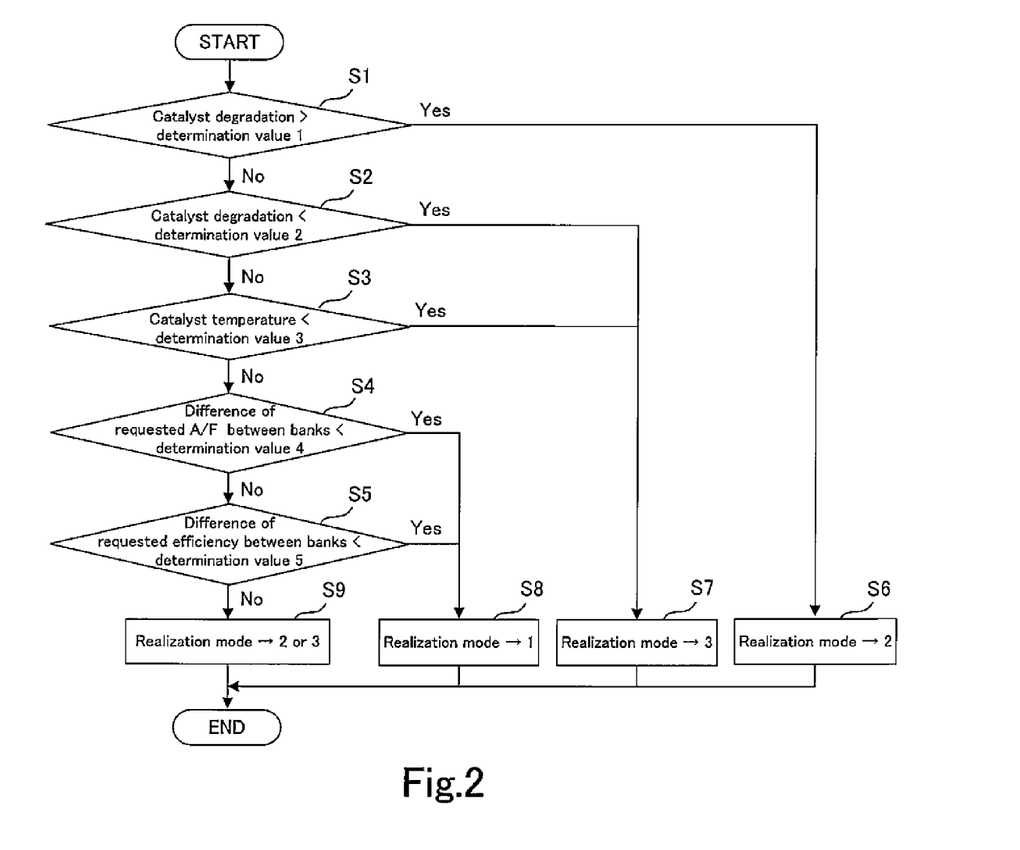
FIG. 2 is a flowchart showing processing for selection of a realization mode that is performed by a control device according to the embodiment of the present invention.

FIG. 2 is a flowchart showing processing for selection of the realization mode that the ECU 10 performs. In the first step S1, the ECU 10 determines whether the degradation degree of the exhaust gas purifying catalyst is larger than a predetermined determination value 1, namely, whether degradation of the exhaust gas purifying catalyst advances exceeding the determination value 1. The method for calculating the degradation degree of the exhaust gas purifying catalyst is not limited. For example, an oxygen occlusion capacity of the exhaust gas purifying catalyst is calculated from an inversion period of an output value of a downstream side oxygen sensor in air-fuel ratio feedback control, and the degradation degree may be calculated from the degree of the oxygen occlusion capacity. In the exhaust gas purifying catalyst in which degradation advances, the oxygen occlusion capacity is reduced, and therefore, if the air-fuel ratio that is requested is not realized directly, the exhaust gas performance is reduced significantly. Thus, when the degradation degree of the exhaust gas purifying catalyst is larger than the determination value 1, the ECU 10 selects the realization mode 2 to give priority to realization of the torque and the air-fuel ratios of the left and right banks (step S6).

When the degradation degree of the exhaust gas purifying catalyst is the determination value 1 or less, the ECU 10 performs determination of the next step S2. In step S2, the ECU 10 determines whether the degradation degree of the exhaust gas purifying catalyst is smaller than a predetermined determination value 2, that is, whether the exhaust gas purifying catalyst is a new catalyst in which degradation does not proceed. As a matter of course, the determination value 2 is a value smaller than the determination value 1. The air-fuel ratio requested from the viewpoint of the exhaust gas performance after activation of the exhaust gas purifying catalyst is basically a stoichiometric ratio, and a request for a rich or lean ratio is a request having the objective of providing the adequate oxygen occlusion capacity. However, a new catalyst has a large oxygen occlusion capacity, and therefore, even if the air-fuel ratio differs from the requested value more or less, the exhaust emission is not significantly worsened if only the direction of rich/lean is the same as the requested value. Thus, when the degradation degree of the exhaust gas purifying catalyst is smaller than the determination value 2, the ECU 10 selects the realization mode 3 to give priority to realization of the torque and the efficiencies of the left and right banks (step S7).

When the deterioration degree of the exhaust gas purifying catalyst is the determination value 2 or more, the ECU 10 performs determination of the next step S3. In step S3, the ECU 10 determines whether the estimated temperature of the exhaust gas purifying catalyst is smaller than a predetermined determination value 3, that is, whether the exhaust gas purifying catalyst is not activated yet. The method for estimating the temperature of the exhaust gas purifying catalyst is not limited. For example, the temperature of the exhaust gas purifying catalyst may be estimated from a bed temperature of the exhaust gas purifying catalyst, or may be estimated from the temperature of exhaust gas. When the exhaust gas purifying catalyst is not activated yet, the purifying capacity and the oxygen occlusion capacity thereof cannot be expected. In this case, the exhaust gas performance is determined by the air-fuel ratio, and therefore, if worsening of the exhaust gas performance at the time of inactivation of the catalyst is to be prevented, priority should be given to the air-fuel ratio instead of the efficiency. However, when the estimated temperature of the exhaust gas purifying catalyst is smaller than the determination value 3, the ECU 10 selects the realization mode 3 to give priority to realization of the torque and the efficiencies of the left and right banks (step S7). In this case, by giving higher priority to realization of the efficiency than the air-fuel ratio, the exhaust gas performance is temporarily reduced. However, warming-up of the exhaust gas purifying catalyst is completed early, and thereby, reduction in the exhaust gas performance in total can be suppressed more.

When the estimated temperature of the exhaust gas purifying catalyst is the determination value 3 or more, the ECU 10 performs determination of the next step S4 and determination of step S5. In step S4, the ECU 10 determines whether a difference between the requested air-fuel ratios of the left and right banks is smaller than a predetermined determination value 4. Further, in step S5, the ECU 10 determines whether a difference between the requested efficiencies of the left and right banks is smaller than a predetermined determination value 5. The air-fuel ratios and efficiencies influence a torque, and therefore, if there are differences in the air-fuel ratio and efficiency between the left and right banks, there arises the fear of occurrence of a torque difference between the left and right banks. However, if the difference in the air-fuel ratio and the difference in efficiency between the banks are small to some extent, the torque difference that occurs due to the differences is very small, and as a result, the influence on the drivability is also small. Thus, when the difference in the requested air-fuel ratio between the banks is smaller than the determination value 4, or the difference in the requested efficiency between the banks is smaller than the determination value 5, the ECU 10 selects the realization mode 1 to give priority to realization of the efficiencies and the air-fuel ratios of the left and right banks (step S8). Thereby, the requested air-fuel ratio and the requested efficiency of each of the banks are both directly realized, and optimization of the fuel efficiency and the exhaust gas performance can be achieved.

When the difference in the requested air-fuel ratio between the banks is the determination value 4 or more, and the difference in the requested efficiency between the banks is the determination value 5 or more, the ECU 10 selects the realization mode 2 or 3. Namely, the ECU 10 selects at least the realization mode that gives priority to realization of the torque. Whether to select the realization mode 2 or the realization mode 3 can be determined in accordance with the operation state and the operation conditions of the engine 2 other than the state of the exhaust gas purifying catalyst. For example, when there is the request for periodical oscillation of the air-fuel ratio, the realization mode 2 can be selected, and when temporary reduction of the efficiency to ensure a reserve torque is requested, the realization mode 3 can be selected.

Hereinafter, control structures that the ECU 10 takes in the respective realization modes will be described.

Figure 3:
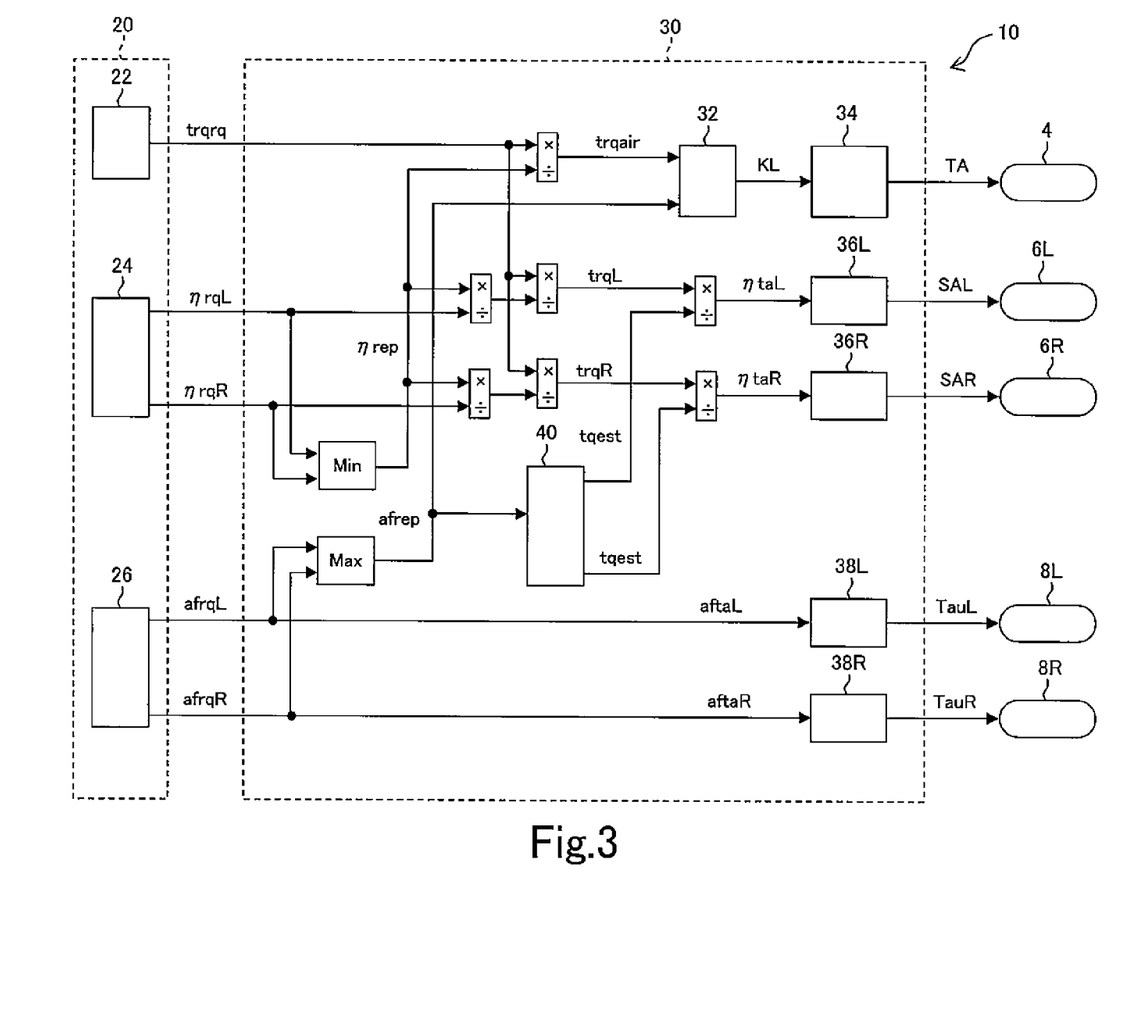
FIG. 3 is a block diagram showing a structure corresponding to a realization mode 1 of the control device according to the embodiment of the present invention.
Figure 4:
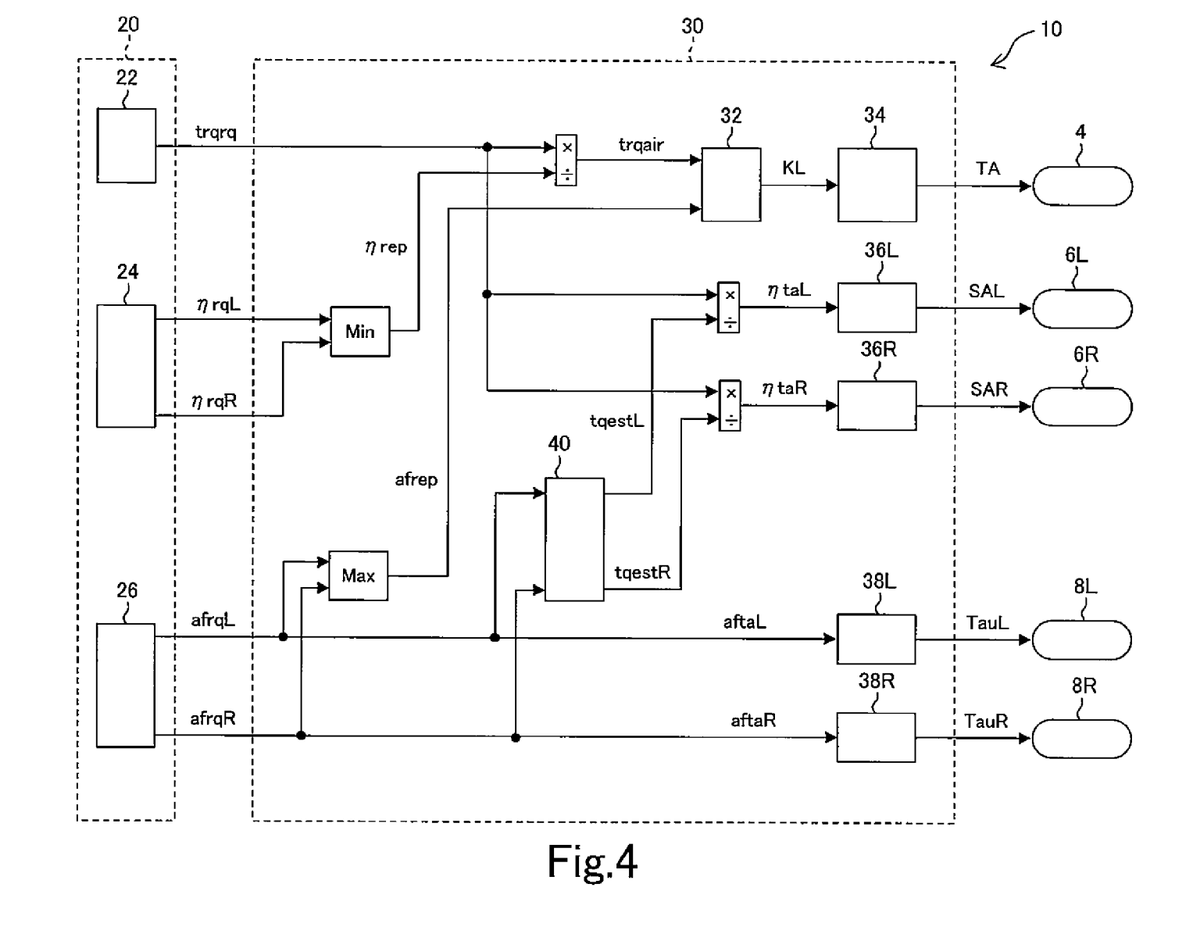
FIG. 4 is a block diagram showing a structure corresponding to a realization mode 2 of the control device according to the embodiment of the present invention.
Figure 5:
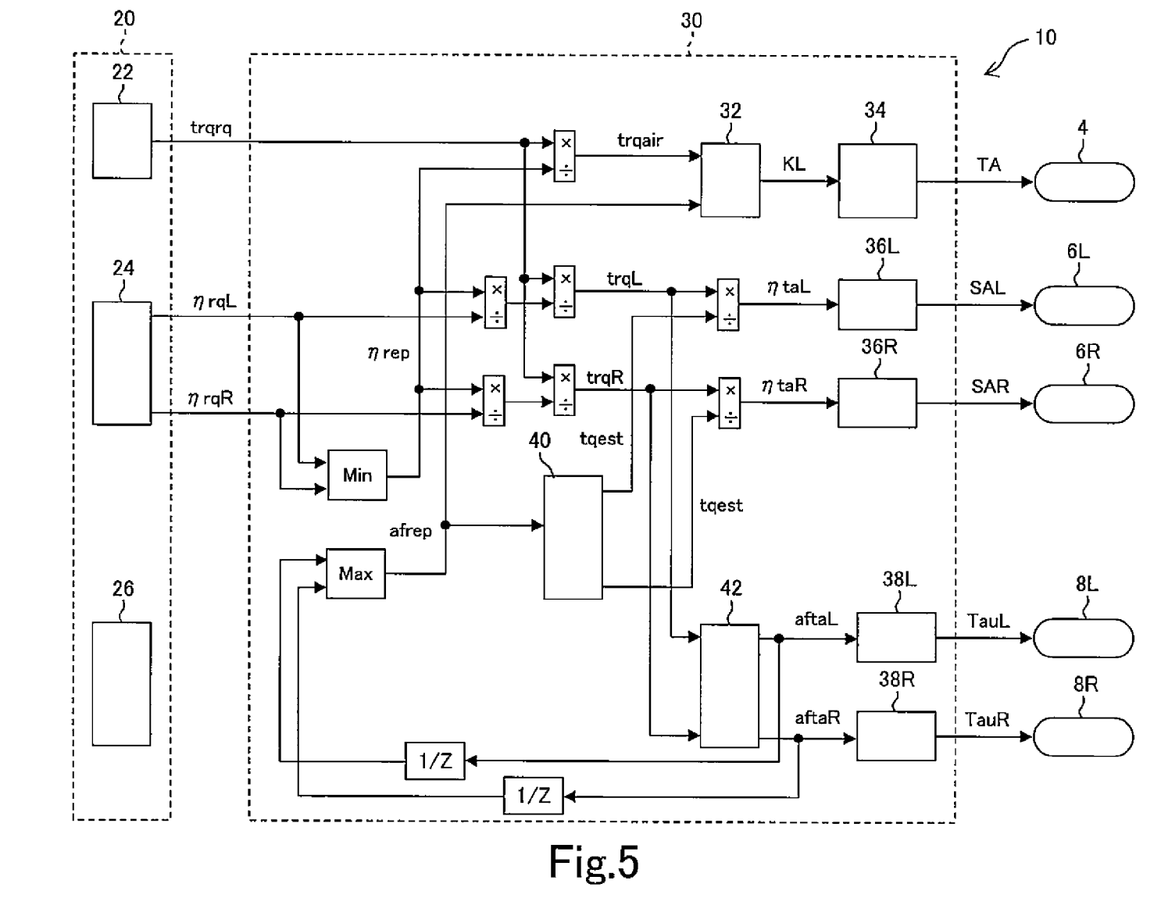
FIG. 5 is a block diagram showing a structure corresponding to a realization mode 3 of the control device according to the embodiment of the present invention.

FIG. 3 to FIG. 5 are block diagrams showing the control structures that the ECU 10 takes in the respective realization modes. FIG. 3 shows a control structure corresponding to the realization mode 1. FIG. 4 shows a control structure corresponding to the realization mode 2, and FIG. 5 shows a control structure corresponding to the realization mode 3. The respective elements that configure the ECU 10 in FIG. 3 to FIG. 5 are only the elements relating to the air amount control, the ignition timing control and the fuel injection amount control by operation of the throttle 4, the ignition devices 6L and 6R and the fuel injection devices 8L and 8R of the left and right banks, which are specially expressed in the drawings, out of various functional elements that the ECU 10 has. Accordingly, FIG. 3 to FIG. 5 do not mean that the ECU 10 is configured by only these elements. Note that the respective elements may be each configured by exclusive hardware, or the respective elements may share hardware and may be virtually configured by software.

When the ECU 10 functions as the control device for an engine, the ECU 10 takes the control structure including two units that are broadly divided, that is, a request mediation unit 20 and a request realization unit 30. The request mediation unit 20 is located at an upstream side of a transmission system of a signal in the control structure, and the request realization unit 30 is located at a downstream side. To the aforementioned actuators 4, 6L, 6R, 8L and 8R, operation signals are outputted from the request realization unit 30. Note that apart from the transmission signals between the blocks shown by the arrows in FIG. 3 to FIG. 5, various signals are passing in the ECU 10. An example of such signals is a signal containing engine information concerning the operation conditions and the operation state of the engine. The engine information contains an engine speed, an output value of a throttle opening sensor, an output value of an air-fuel ratio sensor, actual ignition timing at the present time point, a cooling water temperature, valve timing of an intake valve and an exhaust valve and the like.

First, the request mediation unit 20 will be described. The engine is requested to have various performances such as drivability, fuel efficiency, and exhaust gas performance. They are generated as requests concerning the controlled variables of the engine. However, when a plurality of requests are generated with respect to one controlled variable, all of the requests cannot be completely realized at the same time. Therefore, processing of mediation of the requests becomes necessary for each controlled variable. Mediation mentioned here is, for example, calculation processing for obtaining one numeric value from a plurality of numeric values, such as highest selection, lowest selection, averaging, or superimposition, and a plurality of kinds of calculation processing can be properly combined. In order to carry out such mediation for each controlled variable, the request mediation unit 20 includes three mediation elements 22, 24 and 26. The mediation element 22 collects various requests concerning a torque to mediate them, and outputs a requested torque "trqrq" based on the mediation result. The mediation element 24 collects various requests concerning an efficiency for each of the left and right banks and mediates them, and based on the mediation result, the mediation element 24 outputs a requested efficiency "ηrqL" of the left bank, and a requested efficiency "ηrqR" of the right bank separately. The mediation element 26 collects various requests concerning an air-fuel ratio for each of the left and right banks and mediates them, and based on the mediation result, the mediation element 26 outputs a requested air-fuel ratio "afrqL" of the left bank and a requested air-fuel ratio "afrqR" of the right bank separately.

The request realization unit 30 contains a plurality of statistical models and physical models expressed by maps and functions. Based on the various requested controlled variables that are inputted from the request mediation unit 20, the request realization unit 30 calculates the manipulated variables of the respective actuators necessary for realization thereof. The manipulated variables that are calculated by the request realization unit 30 are a throttle opening "TA" for operating the throttle 4, ignition timing "SAL" for operating the ignition device 6L of the left bank, ignition timing "SAR" for operating the ignition device 6R of the right bank, a fuel injection amount "TauL" for operating the fuel injection device 8L of the left bank, and a fuel injection amount "TauR" for operating the fuel injection device 8R of the right bank. In order to calculate these manipulated variables, the request realization unit 30 includes a plurality of calculation elements. However, as is known from comparison of FIG. 3 to FIG. 5, a configuration of the request realization unit 30 differs according to realization mode. The ECU 10 changes the configuration of the request realization unit 30 in accordance with the selected realization mode.

[Explanation of Realization Mode 1]

With reference to FIG. 3, the configuration and the details of processing of the request realization unit 30 in the realization mode 1 will be described. In the realization mode 1, a minimum value of the requested efficiency "ηrqL" of the left bank and the requested efficiency "ηrqR" of the right bank is determined as a representative efficiency "ηrep". Further, a maximum value, that is, the leanest value of the requested air-fuel ratio "afrqL" of the left bank and the requested air-fuel ratio "afrqR" of the right bank is determined as a representative air-fuel ratio "afrep". In the realization mode 1, as the information for calculating the manipulated variables of the actuators 4, 6L, 6R, 8L and 8R, the requested torque "trqrq", the left bank requested efficiency "ηrqL", the right bank requested efficiency "ηrqR", the left bank requested air-fuel ratio "afrqL", the right bank requested air-fuel ratio "afrqR", the representative efficiency "ηrep" and the representative air-fuel ratio "afrep" are used.

First, calculation of the throttle opening in the realization mode 1 will be described. Main information for use in calculation of the throttle opening is the requested torque "trqrq". However, the requested torque "trqrq" is not directly converted into a throttle opening. By dividing the requested torque "trqrq" by the representative efficiency "ηrep", the air amount controlling torque "trqair" that is a requested potential torque is calculated. When the representative efficiency is smaller than 1, the air amount controlling torque is larger than the requested torque. This means that it is requested of the air amount control by the throttle 4 to enable a larger torque than the requested torque to be potentially outputted.

The air amount controlling torque "trqair" is converted into a target air amount "KL" by a target air amount calculating unit 32. The air amount mentioned here means an air amount that is taken into a cylinder (charging efficiency or a load factor obtained by making the air amount dimensionless also can be used instead). The map used for conversion is a map in which the torque and the air amount are related with various engine state quantities including an engine speed and the air-fuel ratio as a key, on the precondition that the ignition timing is optimum ignition timing (ignition timing at a more retarding side out of MBT and trace knock ignition timing). The map is created based on the data obtaining by testing the engine. For search of the torque-air amount conversion map, actual values and target values of the engine state quantities are used. However, concerning the air-fuel ratio, the aforementioned representative air-fuel ratio "afrep" is used in map search. Accordingly, in the target air amount calculating unit 32, an air amount necessary for realization of the air amount controlling torque "trqair" under the representative air-fuel ratio "afrep" is calculated as a target air amount "KL".

The target air amount "KL" is converted into the throttle opening "TA" by a throttle opening calculating unit 34. For the conversion, an inverse model of an air model is used. Since an air model is a physical model obtained by modeling response characteristics of the air amount to the operation of the throttle 4, the throttle opening "TA" necessary for achievement of the target air amount "KL" can be inversely calculated by using the inverse model thereof. Operation of the throttle 4 by the ECU 10 is performed in accordance with the throttle opening "TA" calculated in the throttle opening calculating unit 34.

Next, calculation of the ignition timing in the realization mode 1 will be described. For calculation of the ignition timing, an estimated torque "tqest" that is calculated in an estimated torque calculating unit 40 is used. The estimated torque calculating unit 40 calculates an estimated torque based on an actual throttle opening that is realized by the aforementioned throttle opening control. The estimated torque in the present description refers to a torque that can be outputted when the ignition timing is set at the optimum ignition timing under the present throttle opening and representative air-fuel ratio "afrep", that is, an estimated value of the potential torque that the engine can output potentially. The estimated torque calculating unit 40 first converts the throttle opening into an estimated air amount by using a forward model of the aforementioned air model. The estimated air amount is an estimated value of the air amount that is actually realized by the present throttle opening. Next, with use of the torque-air amount conversion map, the estimated air amount is converted into the estimated torque "tqest". For search of the torque-air amount conversion map, the aforementioned representative air-fuel ratio "afrep" is used as a search key.

Calculation of the ignition timing is performed for each of the left and right banks. In calculation of the ignition timing of the left bank, a ratio of the representative efficiency "ηrep" to the left bank requested efficiency "ηrqL" is calculated first. Next, by dividing the requested torque "trqrq" by the efficiency ratio, the left bank requested torque "trqL" is calculated. Subsequently, a ratio of the left bank requested torque "trqL" and the estimated torque "tqest" is calculated as a left bank target efficiency "ηtaL". Meanwhile, in calculation of the ignition timing of the right bank, a ratio of the representative efficiency "ηrep" to the right bank requested efficiency "ηrqR" is calculated first. Next, by dividing the requested torque "trqrq" by the efficiency ratio, a right bank requested torque "trqR" is calculated. Subsequently, a ratio of the right bank requested torque "trqR" and the estimated torque "tqest" is calculated as a right bank target efficiency "ηtaR".

The ignition timing "SAL, SAR" of the respective banks is determined based on the corresponding target efficiencies "ηtaL, ηtaR". A left bank ignition timing calculating unit 36L calculates optimum ignition timing based on the engine state quantities such as the engine speed, and calculates a retardation amount with respect to the optimum ignition timing from the left bank target efficiency "ηtaL". When the left bank target efficiency "ηtaL" is 1, the retardation amount is set at 0, and as the left bank target efficiency is smaller than 1, the retardation amount is set to be larger. Subsequently, a result of adding the retardation amount to the optimum ignition timing is calculated as final left bank ignition timing "ηtaL". Meanwhile, a right bank ignition timing calculating unit 36R calculates a retardation amount with respect to the optimum ignition timing from the right bank target efficiency "ηtaR". Subsequently, a result of adding the retardation amount to the optimum ignition timing is calculated as final right bank ignition timing "ηtaR". Operations of the ignition devices 6L and 6R of the respective banks by the ECU 10 are performed in accordance with the ignition timing "SAL, SAR" calculated in the corresponding ignition timing calculating units 36L and 36R.

Finally, calculation of the fuel injection amount in the realization mode 1 will be described. In the realization mode 1, calculation of the fuel injection amount is performed for each cylinder based on the requested air-fuel ratios "afrqL, afrqR" that are requested for the left and right banks respectively. A left bank fuel injection amount calculating unit 38L directly sets the left bank requested air-fuel ratio "afrqL" as a target air-fuel ratio "aftaL" of the left bank, and calculates the fuel injection amount "TauL" of each cylinder of the left bank from the left bank target air-fuel ratio "aftaL" and a predicted air amount at intake valve closing timing of the target cylinder. A right bank fuel injection amount calculating unit 38R directly sets the right bank requested air-fuel ratio "afrqR" as a target air-fuel ratio "aftaR" of the right bank, and calculates the fuel injection amount "TauR" of each cylinder of the right bank from the right bank target air-fuel ratio "aftaR" and a predicted air amount at intake valve closing timing of the target cylinder. Operations of the fuel injection devices 8L and 8R of the respective banks by the ECU 10 are performed in accordance with the fuel injection amounts "TauL, TauR" calculated in the corresponding fuel injection amount calculating units 38L and 38R.

[Explanation of the Realization Mode 2]

Next, with reference to FIG. 4, the configuration and the details of processing of the request realization unit 30 in the realization mode 2 will be described. In the realization mode 2, a minimum value of the requested efficiency "ηrqL" of the left bank and the requested efficiency "ηrqR" of the right bank is selected as a representative efficiency "ηrep". Further, a maximum value of the requested air-fuel ratio "afrqL" of the left bank and the requested air-fuel ratio "afrqR" of the right bank is determined as a representative air-fuel ratio "afrep".

In the realization mode 2, as the information for calculating the manipulated variables of the actuators 4, 6L, 6R, 8L and 8R, the requested torque "trqrq", the left bank requested air-fuel ratio "afrqL", the right bank requested air-fuel ratio "afrqR", the representative efficiency "prep" and the representative air-fuel ratio "afrep" are used. Note that in the realization mode 2, the requested efficiencies "ηrqL, ηrqR" according to banks are not directly used in calculation of the manipulated variables.

In calculation of the throttle opening in the realization mode 2, the air amount controlling torque "trqair" is calculated by dividing the requested torque "trqrq" by the representative efficiency "ηrep". The air amount controlling torque "trqair" is converted into the target air amount "KL" by the target air amount calculating unit 32. In the conversion, the representative air-fuel ratio "afrep" is used as a key for search of the torque-air amount conversion map. Subsequently, the target air amount "KL" is converted into the throttle opening "TA" by the throttle opening calculating unit 34.

In calculation of the ignition timing in the realization mode 2, an estimated torque that is used in calculation of the ignition timing is calculated for each of the left and right banks. The estimated torque calculating unit 40 calculates the left bank estimated torque "tqestL" by using the left bank requested air-fuel ratio "afrqL", and calculates the right bank estimated torque "tqestR" by using the right bank requested air-fuel ratio "afrqR". In more detail, when the estimated air amount is converted into the estimated torque by using the torque-air amount conversion map, the left bank requested air-fuel ratio "afrqL" is used as a search key in the calculation of the left bank estimated torque "tqestL", and the right bank estimated torque "tqestR" is used as a search key in the calculation of the right bank requested air-fuel ratio "afrqR".

In calculation of the ignition timing of the left bank, a ratio of the requested torque "trq" and the left bank estimated torque "tqestL" is calculated as the left bank target efficiency "ηtaL". Subsequently, in the left bank ignition timing calculating unit 36L, the left bank ignition timing "SAL" is calculated based on the left bank target efficiency "ηtaL". Meanwhile, in calculation of the ignition timing of the right bank, a ratio of the requested torque "trq" and the right bank estimated torque "tqestR" is calculated as the right bank target efficiency "ηtaR". Subsequently, in the right bank ignition timing calculating unit 36R, the right bank ignition timing "SAR" is calculated from the right bank target efficiency "ηtaR".

Calculation of the fuel injection amount in the realization mode 2 is performed for each cylinder based on the requested air-fuel ratios "afrqL, afrqR" that are requested for the left and right banks respectively, similarly to the case of the realization mode 1. Namely, in the left bank fuel injection amount calculating unit 38L, the left bank requested air-fuel ratio "afrqL" is directly used as the target air-fuel ratio "aftaL" of the left bank, and the fuel injection amount "TauL" of each cylinder of the left bank is calculated to realize the target air-fuel ratio "aftaL". In the right bank fuel injection amount calculating unit 38R, the right bank requested air-fuel ratio "afrqR" is directly used as the target air-fuel ratio "aftaR" of the right bank, and the fuel injection amount "TauR" of each cylinder of the right bank is calculated to realize the target air-fuel ratio "aftaR".

[Explanation of the Realization Mode 3]

Next, with reference to FIG. 5, the configuration and the details of processing of the request realization unit 30 in the realization mode 3 will be described. In the realization mode 3, a minimum value of the requested efficiency "ηrqL" of the left bank and the requested efficiency "ηrqR" of the right bank is determined as representative efficiency "ηrep", similarly to the case of the realization mode 1. Meanwhile, concerning the air-fuel ratio, a maximum value of the previous value of the left bank target air-fuel ratio "aftaL" and the previous value of the right bank target air-fuel ratio "aftaR" that are calculated in a target air-fuel ratio calculating unit 42 that will be described later is determined as a representative air-fuel ratio "afrep", unlike the case of the realization mode 1. In the realization mode 3, as the information for calculating the manipulated variables of the actuators 4, 6L, 6R, 8L and 8R, the requested torque "trqrq", the left bank requested efficiency "ηrqL", the right bank requested efficiency "ηrqR", the representative efficiency "ηrep" and the representative air-fuel ratio "afrep" are used.

In calculation of the throttle opening in the realization mode 3, the air amount controlling torque "trqair" is calculated by dividing the requested torque "trqrq" by the representative efficiency "ηrep". The air amount controlling torque "trqair" is converted into the target air amount "KL" by the target air amount calculating unit 32. In the conversion, the representative air-fuel ratio "afrep" is used as a key for search of the torque-air amount conversion map. Subsequently, the target air amount "KL" is converted into the throttle opening "TA" by the throttle opening calculating unit 34.

Calculation of the ignition timing in the realization mode 3 is performed for each of the left and right banks similarly to the case of the realization mode 1. In calculation of the ignition timing of the left bank, by dividing the requested torque "trqrq" by a ratio of the representative efficiency "ηrep" to the left bank requested efficiency "ηrqL", the left bank requested torque "trqL" is calculated. Subsequently, a ratio of the left bank requested torque "trqL" and the estimated torque "tqest" is calculated as the left bank target efficiency "ηtaL". The estimated torque "tqest" is calculated by using the representative air-fuel ratio "afrep" by the estimated torque calculating unit 40 similarly to the case of the realization mode 1. In the left bank ignition timing calculating unit 36L, the left bank ignition timing "SAL" is calculated based on the left bank target efficiency "ηtaL" obtained in this manner. Meanwhile, in calculation of the ignition timing of the right bank, by dividing the requested torque "trqrq" by the ratio of the representative efficiency "ηrep" to the right bank requested efficiency "ηrqR", the right bank requested torque "trqR" is calculated. Subsequently, the ratio of the right bank requested torque "trqR" and the estimated torque "tqest" is calculated as the right bank target efficiency "ηtaR". In the right bank ignition timing calculating unit 36R, the right bank ignition timing "SAR" is calculated based on the right bank target efficiency "ηtaR" obtained in this manner.

Finally, calculation of the fuel injection amount in the realization mode 3 will be described. In the realization mode 3, the target air-fuel ratios "aftaL, aftaR" are calculated for the left and right banks respectively by the target air-fuel ratio calculating unit 42. In calculation of the target air-fuel ratios "aftaL, aftaR" by the target air-fuel ratio calculating unit 42, the requested air-fuel ratio outputted from the mediation element 26 of the request mediation unit 20 is not used. In more detail, the target air-fuel ratio calculating unit 42 has a map in which information concerning the operation state of the engine 2 such as a requested torque, an air amount (load), ignition timing and an engine speed is related to the air-fuel ratio. The target air-fuel ratio calculating unit 42 converts the left bank requested torque "trqL" into the target air-fuel ratio "aftaL" of the left bank by using the map, and converts the right bank requested torque "trqR" into the target air-fuel ratio "aftaR" of the right bank. Values in the previous time step of the target air-fuel ratios "aftaL, aftaR" obtained in this manner are used in determination of the aforementioned representative air-fuel ratio "afrep". Meanwhile, values in the current time step of the target air-fuel ratios "aftaL, aftaR" are used in calculation of the fuel injection amount by the fuel injection amount calculating units 38L and 38R. The left bank fuel injection amount calculating unit 38L calculates the fuel injection amount "TauL" of each cylinder of the left bank from the left bank target air-fuel ratio "aftaL". Subsequently, the right bank fuel injection amount calculating unit 38R calculates the fuel injection amount "TauR" of each cylinder of the right bank from the obtained right bank target air-fuel ratio "aftaR".

The above is the explanation of the embodiment of the present invention. However, the present invention is not limited to the aforementioned embodiment, and can be carried out by being variously modified within the range without departing from the gist of the present invention. For example, in the realization modes 1 to 3, the representative efficiency can be made the average value of the requested efficiencies of the left and right banks. Further, concerning the realization mode 1, the representative air-fuel ratio can be made the average value of the requested air-fuel ratios of the left and right banks. Concerning the realization mode 3, the average value of the previous values of the target air-fuel ratios of the left and right banks can be made the representative air-fuel ratio. Furthermore, concerning the realization mode 3, the previous value of the target air-fuel ratio in the bank in which warming-up of the exhaust gas purifying catalyst is uncompleted may be set as the representative air-fuel ratio. Alternatively, the previous value of the target air-fuel ratio in the bank in which the activation of the exhaust gas purifying catalyst is lower may be set as the representative air-fuel ratio. Determination of whether warming-up of the exhaust gas purifying catalyst is uncompleted, and determination of the activation degree of the exhaust gas purifying catalyst can be performed based on the estimated temperature of the exhaust gas purifying catalyst. The previous value of the target air-fuel ratio in the bank in which the estimated temperature of the exhaust gas purifying catalyst is the lowest also can be set as the representative air-fuel ratio.

DESCRIPTION OF REFERENCE NUMERALS

2 Engine
4 Throttle
6L, 6R Ignition device
8L, 8R Fuel injection device
10 ECU
20 Request mediation unit
22, 24, 26 Mediation element
30 Request realization unit
32 Target air amount calculating unit
34 Throttle opening calculating unit
36L, 36R Ignition timing calculating unit
38L, 38R Fuel injection amount calculating unit
40 Estimated torque calculating unit
42 Target air-fuel ratio calculating unit

The invention claimed is:

1. A control device for an internal combustion engine that has a single throttle shared by a plurality of cylinder groups, and has an exhaust gas purifying catalyst for each of the cylinder groups, comprising:

a unit that acquires a requested torque, the requested torque being a requested value of a torque with respect to the internal combustion engine;

a unit that acquires a requested efficiency by cylinder group, the requested efficiency by cylinder group being a requested value for each of the cylinder groups of an efficiency that is a ratio of a torque that is actually outputted to a potential torque that the internal combustion engine can potentially output;

a unit that determines a target air-fuel ratio by cylinder group, the target air-fuel ratio by cylinder group being a target value of an air-fuel ratio in each of the plurality of cylinder groups;

a unit that determines a representative efficiency based on the requested efficiency by cylinder group;

a unit that determines a representative air-fuel ratio based on the target air-fuel ratio by cylinder group;

a unit that calculates a requested potential torque, the requested potential torque being a requested value of the potential torque by dividing the requested torque by the representative efficiency;

a unit that calculates a target air amount, the target air amount being a target value of an air amount for realizing the requested potential torque under the representative air-fuel ratio, based on data in which a relation of an air amount and a torque in optimum ignition timing is set in association with an air-fuel ratio;

a unit that controls an opening of the throttle in accordance with the target air amount;

a unit that calculates an efficiency ratio of the representative efficiency and the requested efficiency by cylinder group, and calculates a requested torque by cylinder group by dividing the requested torque by the efficiency ratio for each of the cylinder groups;

a unit that calculates an estimated potential torque, the estimated potential torque being an estimated value of the potential torque that is realized under the optimum ignition timing, the representative air-fuel ratio and an actual throttle opening;

a unit that calculates a ratio of the requested torque by cylinder group and the estimated potential torque as a target efficiency by cylinder group;

a unit that controls ignition timing for each of the cylinder groups in accordance with the target efficiency by cylinder group; and a unit that controls a fuel injection amount of each cylinder in accordance with the target air-fuel ratio by cylinder group.

2. The control device for an internal combustion engine according to claim 1, wherein the unit that determines the target air-fuel ratio by cylinder group acquires a requested air-fuel ratio by cylinder group, the requested air-fuel ratio by cylinder group being a requested value of an air-fuel ratio for each of the cylinder groups, determines the requested air-fuel ratio by cylinder group as a target air-fuel ratio by cylinder group in a current time step, and the unit that determines the representative air-fuel ratio determines the representative air-fuel ratio based on the target air-fuel ratio by cylinder group in the current time step.

3. The control device for an internal combustion engine according to claim 1, wherein the unit that determines the target air-fuel ratio by cylinder group determines a target air-fuel ratio by cylinder group in a current time step based on the requested torque by cylinder group and an operation state of the internal combustion engine, and the unit that determines the representative air-fuel ratio determines the representative air-fuel ratio based on a target air-fuel ratio by cylinder group in a previous time step.

4. The control device for an internal combustion engine according to claim 1, wherein the unit that determines the representative air-fuel ratio determines a maximum value of the target air-fuel ratios by cylinder group as the representative air-fuel ratio.

5. The control device for an internal combustion engine according to claim 3, wherein the unit that determines the representative air-fuel ratio determines a target air-fuel ratio by cylinder group corresponding to a cylinder group in which an estimated temperature of the exhaust gas purifying catalyst is the lowest as the representative air-fuel ratio.

6. The control device for an internal combustion engine according to claim 1,
   wherein the unit that determines the representative efficiency determines a maximum value of the requested efficiency by cylinder group as the representative efficiency.

* * * * *